United States Patent
Ramesh et al.

(10) Patent No.: US 8,434,125 B2
(45) Date of Patent: Apr. 30, 2013

(54) DISTRIBUTED SECURITY ARCHITECTURE

(75) Inventors: Tirumale K. Ramesh, Centreville, VA (US); John L. Meier, St. Charles, MO (US); Jason Edward Amanatullah, Campbell, CA (US); Ming-Yuh Huang, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 947 days.

(21) Appl. No.: 12/043,034

(22) Filed: Mar. 5, 2008

(65) Prior Publication Data

US 2009/0228951 A1    Sep. 10, 2009

(51) Int. Cl.
*H04L 29/06* (2006.01)
(52) U.S. Cl.
USPC .................................. 726/1; 726/8; 709/224
(58) Field of Classification Search .................. 726/1, 8; 709/224
See application file for complete search history.

(56) References Cited

U.S. PATENT DOCUMENTS

| | | | |
|---|---|---|---|
| 6,744,729 B2 | 6/2004 | Tinsley | |
| 6,981,029 B1 * | 12/2005 | Menditto et al. | 709/217 |
| 7,299,339 B2 | 11/2007 | Ramesh | |
| 7,539,175 B2 * | 5/2009 | White et al. | 370/350 |
| 7,716,240 B2 * | 5/2010 | Lim | 707/781 |
| 7,831,693 B2 * | 11/2010 | Lai | 709/220 |
| 2002/0194506 A1 * | 12/2002 | Wiley et al. | 713/201 |
| 2005/0152270 A1 * | 7/2005 | Gomez Paredes et al. | 370/229 |
| 2005/0182582 A1 | 8/2005 | Chen | |
| 2006/0031450 A1 | 2/2006 | Unrau et al. | |
| 2006/0089938 A1 * | 4/2006 | Leonard et al. | 707/100 |
| 2006/0095716 A1 | 5/2006 | Ramesh | |
| 2007/0162599 A1 * | 7/2007 | Nguyen | 709/225 |
| 2008/0022354 A1 * | 1/2008 | Grewal et al. | 726/1 |
| 2008/0040574 A1 | 2/2008 | Ramesh | |
| 2008/0120264 A1 * | 5/2008 | Lee et al. | 706/47 |
| 2009/0006116 A1 * | 1/2009 | Baker et al. | 705/1 |
| 2009/0034738 A1 * | 2/2009 | Starrett | 380/278 |
| 2009/0086971 A1 * | 4/2009 | Grayson et al. | 380/247 |

OTHER PUBLICATIONS

Mika Ratola, Which Layer for mobility?—Comparing Mobile IPv6, HIP and SCTP, 2004, Helsinki University of Technology.*

* cited by examiner

*Primary Examiner* — Michael Simitoski
*Assistant Examiner* — Ali Shayanfar
(74) *Attorney, Agent, or Firm* — Klintworth & Rozenblat IP LLC (57) ABSTRACT

A distributed security architecture may include: a mobile anti-tamper hardware policy enforcement point configured to control communication behaviors of a mobile client by enforcing communication policies within a policy decision point; a mobile anti-tamper hardware policy decision point encapsulated within the mobile anti-tamper hardware policy enforcement point; a policy exchange channel for policy distribution modes configured to distribute and/or update communication and routing security policies to the mobile client; a contextual manager configured to handle system-wide status change update signaling; and a mobility authentication manager configured to provide mobile clients with registration and credential/role assignments based on mobile access policies. The distributed security architecture may be configured to provide open system interconnection layer 3.5 policy-based secure routing, and open system interconnection layer 2 policy-based mandatory access control address filtering to provide secure communication and computing for layers 4, 5, 6, and 7.

11 Claims, 8 Drawing Sheets

| OPEN SYSTEM INTECONNECTION (OSI) Layers | Description |
|---|---|
| 7 | Application |
| 6 | Presentation |
| 5 | Session |
| 4 | Transport |
| 3.5 | Claimed OSI-3.5 Distributed Security Policy Enforcement Layer |
| 3 | Network |
| 2 | Data Link |
| 1 | Physical |

| OPEN SYSTEM INTECONNECTION (OSI) Layers | Description |
|---|---|
| 7 | Application |
| 6 | Presentation |
| 5 | Session |
| 4 | Transport |
| 3.5 | Claimed OSI-3.5 Distributed Security Policy Enforcement Layer |
| 3 | Network |
| 2 | Data Link |
| 1 | Physical |

FIG. 1

| Layer | Critical Issues |
|---|---|
| Application Layer 7 | Detecting and preventing viruses, worms, malicious codes, and application/insider abuses, transaction anomaly detection, policy authorization framework, vulnerability assessment and risk management. |
| Transport Layer 4 | Authenticating and securing end-to-end communication through data encryption |
| Network Layer 3 | Protecting the ad-hoc routing and forwarding protocols from attacks, Denial of service attacks |
| Link Layer 2 | Protecting wireless Mandotory access control protocol and providing link-layer security support including prevention of Mandotory access control address cloning attacks |
| Physical Layer 1 | Signal/radio jamming Denial of Service attacks |

```
<POLICY>
    <ROLE name="POLICE">
        <THREAT name="ORANGE">
            <POLICY_RULE name="H323">
                <ALLOW name="POLICE">
                    <DIRECTION>INOUT</DIRECTION>
                </ALLOW>
            </POLICY_RULE>
        </THREAT>
        <THREAT name="RED">
            <POLICY_RULE name="H323">
                <ALLOW name="POLICE">
                    <DIRECTION>INOUT</DIRECTION>
                </ALLOW>
                <ALLOW name="FIRE">
                    <DIRECTION>INOUT</DIRECTION>
                </ALLOW>
            </POLICY_RULE>
        </THREAT>
    </ROLE>
</POLICY>
```

DISTRIBUTED SECURITY ARCHITECTURE

BACKGROUND

In the next-generation distributed computing environment, large scale system of systems may have a large number of roaming mobile nodes/devices. These devices may form various community of interests to carry out the intended commercial, military, or social processes. The concept of community of interest formation may represent the very foundation of next generation information assurance challenges, such as complex authorization, i.e. who gets access to what. In the military context, an example may be intelligence sharing amongst multiple agencies based on various need-to-know security credentials as well as secure operation governing policies.

Such highly dynamic mobile environments may also be characterized by several additional security challenges. The number of mobile nodes may be high and the number of the communities of interests that could formulate may also be high. Security management of such highly complex environments may require new and innovative solutions. A large percentage of these nodes may be mobile—such as in the mobile ad-hoc network environment. They may come and go frequently. Effective secure routing and communication may need to be addressed.

The business logic that dictates how these nodes work together (e.g. community of interest formation based on necessary conditions) may be highly complicated. Furthermore, the business logic that dictates the security behaviors of fix-nodes (infrastructure nodes) may need to be consistently enforced onto the mobile nodes to avoid double standards. The complexity of the future business model such as virtual enterprise, collaborative engineering, and coalition warfare may not be implemented by today's limited static mobile information assurance solutions.

The future may be a very dynamic environment. The dynamics may not only come from the nodes moving around and moving in and out of community of interests. The dynamics may also come from constant and rapid changes of business requirements at the application level—e.g. virtual enterprise contract re-negotiation, coalition warfare procedure updates, etc. All these changes may require rapid re-configuration of security parameters in both the mobile and static environments, and these roaming nodes/devices may need to comply rapidly to conform with new high level business requirement updates. Timing may also be essential to have the ability to update the policies as well as in the distribution and propagation of updates to the mobile nodes.

One challenge we are facing today is that traditional software-oriented mobile information assurance implementation may not only expose these mobile devices/clients to the before mentioned traditional attacks, but it may also not provide an effective community of interest management framework to allow these devices to work together securely and dynamically to satisfy both mandatory access control and discretionary access control requirements of next generation human business processes.

The future may require a more comprehensive hardware/software combined technology solution that addresses not only open system interconnection (OSI) layer 6-7 application software security, but which also may utilize advanced hardware implementation to aid network/routing layer isolation and community of interest formation. To align with such trends, a hardware/software combined solution is needed which addresses critical needs in next generation distributed system security applications.

SUMMARY

In one aspect of the disclosure, a distributed security architecture may comprise the following: a mobile anti-tamper hardware policy enforcement point which may be configured to control communication behaviors of a mobile client by enforcing communication policies within a policy decision point; a mobile anti-tamper hardware policy decision point which may be encapsulated within the mobile anti-tamper hardware policy enforcement point; a policy exchange channel for policy distribution nodes which may be configured to at least one of distribute and update communication and routing security policies to the mobile client; a contextual manager which may be configured to handle system-wide status change update signaling; and a mobility authentication manager which may be configured to provide mobile clients with registration and credential/role assignments based on mobile access policies. The distributed security architecture may be configured to provide OSI layer 3.5 policy-based secure routing, and open system interconnection layer 2 policy-based mandatory access control address filtering in order to provide secure communication and computing for layers 4, 5, 6, and 7.

In another aspect of the disclosure, a method of implementing policies to mobile clients may be provided. In one step, a secure mobile routing policy may be provided. In another step, a packet discrimination policy may be provided. In still another step, the secure mobile routing policy and the packet discrimination policy may be distributed to the mobile clients.

In still another aspect of the disclosure, a method for creating a hardware and software combined solution may be provided. In one step, a hardware and software combined solution may be provided. In another step, open system interconnection layer processing may be provided. In still another step, the open system interconnection layer processing may be implemented into the hardware and software combined solution.

In yet another aspect of the disclosure, a method of defining a packet discrimination policy may be provided. In one step, specifications of packets may be provided that should be received by mobile clients. In another step, the packets received by the mobile clients may be used to create a protocol session at an open system interconnection layer 4.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Beyond the goal of the original internet which may have been to provide reliable and resilient end-to-end communication between pairs of hosts, the disclosure may provide policy-managed communities of interest within which individuals may access network-connected data, computing, tooling and other assets they may need to engage. In the architecture provided by the disclosure, assets may be kept under the control of a policy manager. In other words, assets may be protected so that they respond only to requests from subjects based on the approval of entitlement-specifying policies. The policy-enabled community of interests of the disclosure may have the ability to provide superior frameworks for regulating the way complex processes work. The community of interest policies of the disclosure may be used to define regulations regarding how private information is controlled. The information assurance provided by the disclosure may go beyond just securing information. As discussed below, the assurance solutions of the disclosure may provide authenticity, confidentiality, integrity, anonymity, and availability.

The disclosure may provide authenticity by requiring a digital authentic originality of each element. The authenticated elements may include subject, person, software, hardware, system processes, information/data, and others. Additionally, non-repudiation (e.g. authentic accountability during a digital communication or transaction) may also be part of the authenticity requirement.

The disclosure may provide confidentiality by protecting the elements from preying eyes. The elements which may be protected may include, but not be limited to, data, information, aggregated information, processes, identity, communication, and transaction meta-information such as volume. Solutions such as public key infrastructure may be used to achieve both authenticity and confidentiality purposes using public and private key pairs.

The disclosure may provide integrity by making sure the element content has not been altered. One example may be avionic hardware/software of airplanes. Compromised data content may potentially lead to fatal consequences. The elements that may require integrity protection may include, but not be limited to, software, hardware, communication channels, and processes.

The disclosure may provide anonymity by helping to protect against cybercrime and other potential abuses to retain the privacy for both individuals and businesses. As part of the overall information assurance requirements, anonymity may protect the identity of potential victims from the investigating parties. The disclosure may require software, hardware, communication, and process anonymity.

The disclosure may provide availability by providing available infrastructures to protect against threats including denial of service or distributed denial of service. These types of threats may create huge volume traffic/transactions which may overwhelm victims and may prevent them from performing regular services. The denial of service caused by these types of threats may not be limited to only open system interconnection layer 3 packet flooding attacks. For instance, the denial of service may happen at transport layer 1 with radio jamming as well as at layer 6 with transaction volumes. The disclosure may reduce these threats.

Figure 1:
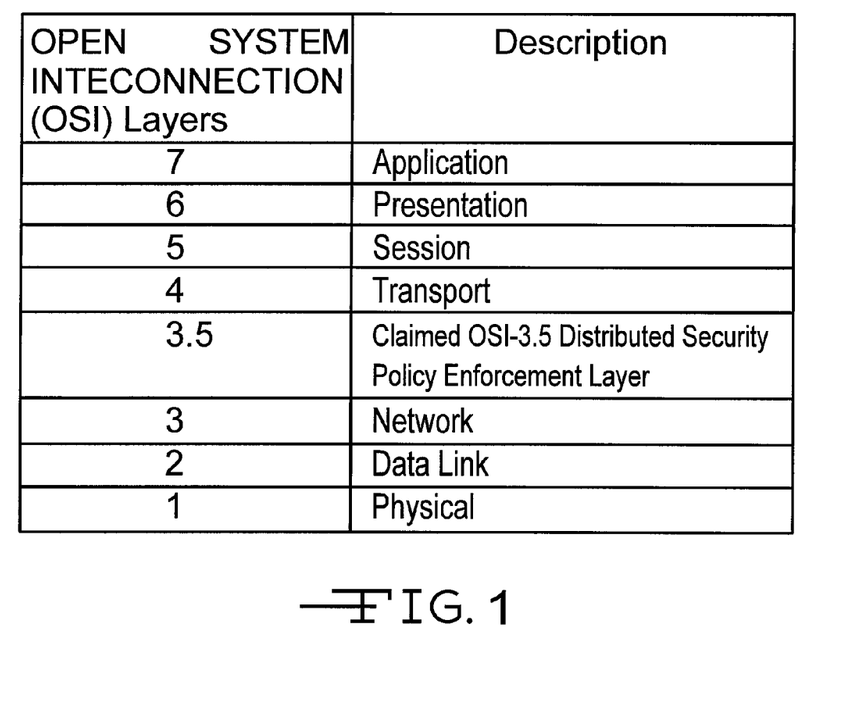
FIG. 1 shows one embodiment of a standard-based Open Systems Interconnection (OSI) reference model with abstractions of layers 1 through 7, and layer 3.5 which is situated in between OSI layer 3 and OSI layer 4.

FIG. 1 shows one embodiment of an open systems interconnection basic reference model (open system interconnection reference model—OSI model for short) with abstractions of layers 1 through 7, and layer 3.5 which is situated in between OSI layer 3 and OSI layer 4. The open systems interconnection reference model may comprise a layered, abstract description for communications and computer network protocol design, developed as part of an open systems interconnection initiative. It may also be called an open system interconnection seven layer model. The layers may comprise, from top to bottom, an application layer 7, a presentation layer 6, a session layer 5, a transport layer 4, a OSI-3.5 distributed security policy enforcement layer, a network layer 3, a data link layer 2, and a physical layer 1. A layer may comprise a collection of related functions that may provide services to the layer above it, and which may receive service from the layer below it. For example, a layer that provides error-free communications across a network may provide the path needed by applications above it, while it may call the next lower layer to send and receive packets that make up the contents of the path. The disclosure may provide areas of authenticity, confidentiality, integrity, anonymity, and availability, at various levels in the open system interconnection layer.

The context of security primitives contributions in the layers are described below. In traditional firewall implementations, protection profiles tend to be static and their implementation is often geared toward protecting static infrastructure enclaves. In the upcoming next generation of computing paradigms, in which collaboration, sharing, and efficiency may be crucial, traditional firewall implementations may not be able to scale up to meet the challenge. Furthermore, constantly changing security requirements, such as business contract negotiations, updates, suspection, dynamic coalition warfare agreements, and new and improved business paradigms, may require flexible and expressive policy-based implementation orientations to satisfy environments where there may be increases in network connectivity, mobility, and COI complexity.

While not all layers (such as the presentation layer 6) may be fully implemented in today's communication systems, each layer may present its own risk in the information assurance context. For example, at physical layer 1, physical media (wire or wireless) may be vulnerable to various physical attacks. Similarly, in a mobile ad-hoc network (MANET) environment, at layer-3, there may exist various attack on the mobile routing protocol.

Figure 2:
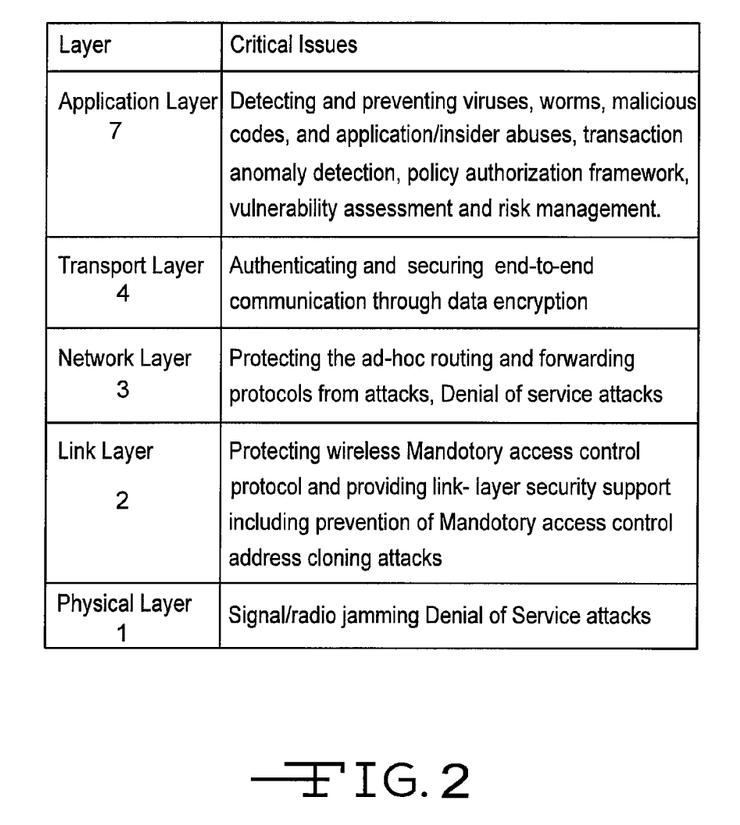
FIG. 2 is a chart showing one embodiment of how a combination of authenticity, confidentiality, integrity, anonymity, and availability may be implemented in the model of FIG. 1.

FIG. 2 shows a chart showing, under one embodiment of the disclosure, how a combination of authenticity, confidentiality, integrity, anonymity, and availability may be implemented in the application layer 7, the transport layer 4, the network layer 3, the link layer 2, and the physical layer 1 of FIG. 1 in order to provide a comprehensive information assurance solution in the open system interconnection layers. In other embodiments, the comprehensive information assurance solution may also be applied in presentation layer 6, session layer 5, and/or distributed security policy enforcement layer 3.5 of FIG. 1 to provide authenticity, confidentiality, integrity, anonymity, and availability in all layers.

As discussed below, the disclosure may provide an open system interconnection layer 3.5 with policy-based secure routing, and an open system interconnection layer 2 with policy-based mandatory access control address filtering in order to provide secure communication/computing foundations for layers 4, 5, 6, and 7. This may integrate with other advanced information assurance technologies at layer 2 and below, as well as at layer 5 and above, to achieve more comprehensive LSI (large-scale system of systems integration) competitive technology capability.

Figure 3:
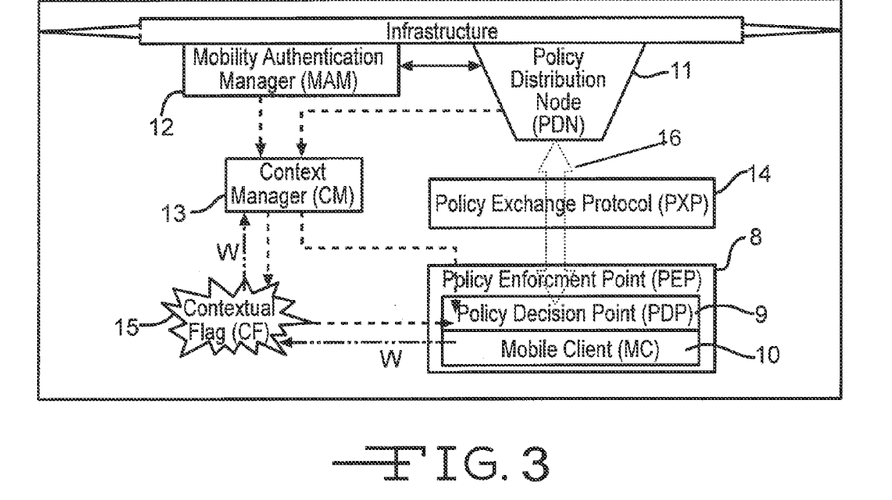
FIG. 3 is a diagram showing one embodiment of a distributed security architecture.

FIG. 3 shows one embodiment of a distributed security architecture that may address mobile IA challenges by presenting an OSI middle layer 3.5 and below with hardware/software combined solutions in conjunction with available anti-tamper technology. This embodiment may be further characterized by the concept of distributing security policies directly into secure mobiles devices and clients. By doing so, these clients may become security aware due to the presence of the policies, and may work together uniformly to formulate appropriate COI to satisfy high level business process security requirements. The embodiment may not address anti-tamper technology.

The functions of the architectural components shown in FIG. 3 are provided below. A mobile policy enforcement point (PEP) 8 may control the communication behaviors of the mobile client 10 to support a method for encapsulation by enforcing the communication policies within a policy decision point (PDP) 9. The policy decision point 9 may control the policy distribution/update between the policy decision point 9 and an infrastructure policy distribution node (PDN) 11 to support a method in which, based on the permissions specified in policies carried by the policy decision point 9, the policy decision point 9 may control read access to contextual flags (CF) 15 for context-aware (e.g. elevated alert) decision making by the policy decision point 9. This may support a method in which, based on the permissions specified in the mobile client PDP 9 policies, the PEP 8 controls the write access to the contextual flags 15 for global situation updates (e.g. to proactively elevate alert(s)), which may subsequently affect PDP 9 decision making in other mobile clients (MC) 10.

The mobile policy decision point 9 may support its encapsulation within the PEP 8, and may allow its implementation with anti-tamper field programmable gate array (FPGA) hardware to ensure the integrity of the authorization logic. The mobile policy decision point 9 may also provide hardware implementations that are read-proof to prevent authorization logic disclosures. Furthermore, the mobile policy decision point 9 may provide policies that may come from the infrastructure policy distribution node 11, which may be a target-client within a policy authorization framework.

The mobile client 10 that may supports its encapsulation within the PEP 8 and the PDP 9 may support a method, in which depending on the permissions specified by MC 10 PDP 9 policies, some MCs' 10 may have privileges to update certain contextual flags 15 to cause global behavior changes. For example, if per the specification in the policies, a colonel may be allowed the privilege of updating the "Alert Level" from yellow to red at his/her discretion. Under such circumstances, the MC 10 the colonel operates may be allowed to access the "write" port of the "Alert Level" contextual flags 15 per the communication policy specification within PDP 9. Such an update may create cascading effects on other MCs' 10—which may be an intended security behavior articulated by the policies.

A policy distribution node (PDN) 11 may be provided that may distribute and update communication and routing security policies to MCs' 10 via a policy exchange channel (PXC) 16 with PDNs' 11 acting as target-clients and distributing security policies to policy decision points 9 of the mobile clients 10. Not all the MCs' 10 may carry security policies. Therefore, the PDN 11 may be policy based for selective and secure policy distribution. Working with a mobility authentication manager (MAM) 12, the PDN 11 may distribute the appropriate set of security policies to the MCs' 10 based on their mandatory access control identities and roles (entitlements). This may be where the policy mapping occurs from OSI layer 7 application to layer 3.5 communication. When application layer 7 policy is mapped to layer 3.5, certain networking information may be required, such as the subject's and object's (e.g. colonel, command-and-control node) IP address, port number, or mandatory access control address. Within this context, layer 3.5 policy may be defined to enforce ultimate security requirements by executing the necessary enforcement paradigm. Working PDN 11 and MAM 12 may provide the appropriate networking parameter and context for the appropriate policy articulation and distribution.

The PXP 14 may provide for a secure security assertion protocol that may allow distribution of policies from the PDN 11 to the PDP 9 through the PEP 8. Existing industry standards such as SAML (security assertion markup language), RMI (remote method invocation), TLS (transport layer security), or SSH FTP secure extension (RFC-2228) may be reviewed for PXP 14 implementation.

A contextual manager (CM) 13 may be provided that handles system-wide status change update signaling, including e.g. alert level updates, policy updates, client revocations, etc. CM 13 may updates "policy update" contextual flags 9 based on the notices from the PDN 11. Such updates may alert the MC 10, the PEP 8, and the PDP 9 to perform proactive PDP 9 policy updates. Such updates of the CF 15 may not comprise the policy distribution action itself. Instead, it may comprise an update of a CF 15 beacon that may indicate the need for the MC 10 to return to the PDN 11 for policy update and distribution. This may be illustrated in FIGS. 4 and 5, where "Policy Update" notification may be broadcasted using the similar mechanism as the Alert Level 23 flag, as discussed later herein. Since the mobile agents may be out in the field with unknown connectivity, this mechanism may provide a notification paradigm where mobile agents monitor CF 15 and return (pull back) for policy updates rather than PDN 11 attempting to "push" policies to agents with unknown connectivity. CM 13 may also maintain appropriate "revocation update" CFs' 15 based on notices from the mobility authentication manager 12. Such updates may alert the MC 10, the PEP 8, and the PDP 9 of the availability of updates on revocation on identities and roles (credentials). The MC 10, the PEP 8, and the PDP 9 may then proceed to connect and receive updates from the PDN 11. As a result of such revocations, the PDP 9 policy decision result may be different. In other words, the CM 13 may control the "beacons" that are necessary in managing the update and life-cycle of the MCs' 10.

The contextual flags 15 may be used for global data storage media for system-wide status indication. The CF 15 may perform global status publish and subscription functions working in conjunction with the PDP 9. When making decisions, the PDP 9 policies may take into consideration certain global variables, such as "alert level", "system ready status", or "resource availability" CFs' 15 to become context aware in the real time evaluation and decision making process. Depending on the permission specified by the policies within the PDP 9, some MCs' 10 may have the authority to update the CFs' 15. Thus, these MCs' 10 may have the ability to indirectly affect subsequent global PDP 9 decision making via the CF 15 updates. Typically, these MCs' 10 may have the roles of sensor or situation assessment nodes.

The mobility authentication manager 6 may provide the MCs' 10 with initial registration and credential/role assignments which may provide the MCs' 10 with identity and entitlement to update the revocation process. It may also provide the MCs' 10 with identity and role information to the PDN 11 for appropriate policy distribution and updates. The MAM 12 may alert the context manager 13 when updates or revocations require the attention of the MC 10. Different kind of security policies such as secure mobile routing polices which define selective routing behavior, packet discrimination policies which define selective packet reception behavior, and OSI layer-2 mandatory access control address filtering policies which defines selective frame level connectivity behavior may all be distributed to the policy decision points 9 associated with the mobile clients 10.

The architecture components described in FIG. 3 may be implementations at open system interconnection layer-3.5. The security policies enforced by these architecture components may be extensions from the OSI layer 7 application level policies, roles, meta data tags, and the necessary MAC address and IP address mapping. As such, OSI layer 3.5 may work with OSI layer 7 to achieve systematic engineering-process-based communication security enforcement to enhance the overall MANET mobile network security.

Secure mobile routing policies may control mobile clients 10 to perform mobile routing service. The policies may specify which neighbors the mobile client 10 should trust for routing, as well as to what degree the mobile clients 10 should participate in generic routing. The policies may be written in such a way that the logic will take into consideration the various contextual flags 15 status updates, and will instruct the mobile clients 10 to behave differently in routing participation. In another embodiment incorporating varying policies, the routing behavior may be more or less restrictive (more or less secure) as well as more or less dynamic (e.g. responding to emergency situations). Layer 3.5 policies may not exist by themselves. They may comprise an integral part of the overall comprehensive open system interconnection layer 1-7 security architecture.

Under the disclosure, human/business system security requirements (often in human language—e.g. English, business, contracts, laws, operation procedures) may be modeled and captured into roles, meta-data tags, and application level authorization policies in the policy authorization framework context. This may be how the application level security policies may be extrapolated into layer 3.5 policies that may be carried with it the appropriate context of roles, meta data tags, context, etc.

For example, a battleground operation procedure may mandate colonels have access to command-and-control data. This may be captured in a layer-7 application requirement model, and in a subsequent application security policy saying: colonel→command and control data. Such a policy may be further enhanced by extrapolation using a mandatory access control address, an IP address of the colonel's handheld device, a mandatory access control/internet protocol addresses of the command and control data resource clients, and any additional context data such as the time of day (e.g. 8:00-18:00). Thus at layer 3.5, a hardware enforced policy may look like: colonel radio's internet protocol and port→command and control 2 data client's internet protocol and port, if current time is between 8:00 and 18:00. In the meantime, all other communication may be effectively blocked out (packets dropped) to prevent the spread of worms, viruses, and trojans, unless there are other policy-approved communication channels for the hosts.

Packet discrimination policies that may reside in PDP 9 (shown in FIG. 3) may comprise unique features that specify which of the packets received by the mobile may be used to construct protocol/session and above (open system interconnection layer 4 and above). Essentially, un-trusted packets may be discarded per the specification of the policies. As a result, OSI layers 4, 5, 6, and 7 may each have no visibility on these potentially harmful packets and therefore may each be immune from the potential damage. The application and the system may then be protected from the harms that could come from these communications. By distributing and enforcing layer 3.5 security policies to mobile nodes, various community of interest may be formed. Additionally, proprietary and other authorization control architecture principles may be applied to the specified policies based on the method in the control architecture which may result in a scalable community of interest infrastructure.

Figure 4:
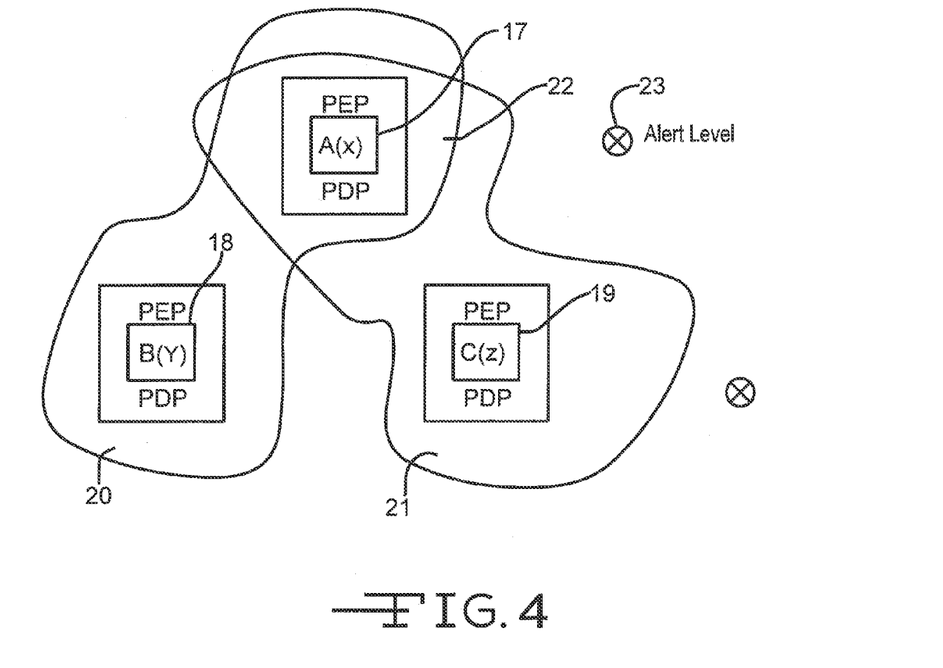
FIG. 4 is an overlapping chart of one embodiment showing conceptually how mobile clients may form two different communities of interest based on their roles, mobile policy enforcement point, and mobile policy decision point.

FIG. 4 is an overlapping chart of one embodiment showing conceptually how mobile clients 17, 18, and 19 (A, B, and C) may form two different communities of interest based on their roles and may encapsulate mobile policy enforcement point and mobile policy decision point (ie encapsulating the PDP and PEP of A, B, and C,). Client A 17 may comprise Role-X which may be the FBI, Client B 18 may comprise Role-Y which may be the EMT, and Client C 19 may comprise Role-Z which may be the Police. These policies may dictate that Role-Y (EMT) is entitled to community of interest COI 20, Role-Z (Police) is entitled to COI 21, and Role-X (FBI) is entitled to COI 22 comprising both COI 20 and COI 21. There may also be context-flags 23 that denote situations such as alert-level 23 to indicate global emergency status or policy updates to indicate availability of new policy sets. These context-flags 23 may be monitored by 17 (A), 18 (B), and 19 (C), and may be used for policy evaluation decision making by policy decision point 9.

All three mobile clients 17, 18, and 19 may be encapsulated in an anti-tampered hardware implemented policy enforcement point 8 environment to ensure faithful execution of the mobile policies policy decision point 9 (ie encapsulating PEP/PDP surrounding A, B, and C). The policy decision point 9 itself may also comprise anti-tamper hardware normally implemented with a field programmable gate array (FPGA). Open system interconnection-3.5 policies may be intelligent to take into consideration the contextual situation such as alert elevation and the reform community of interest configuration.

Figure 5:
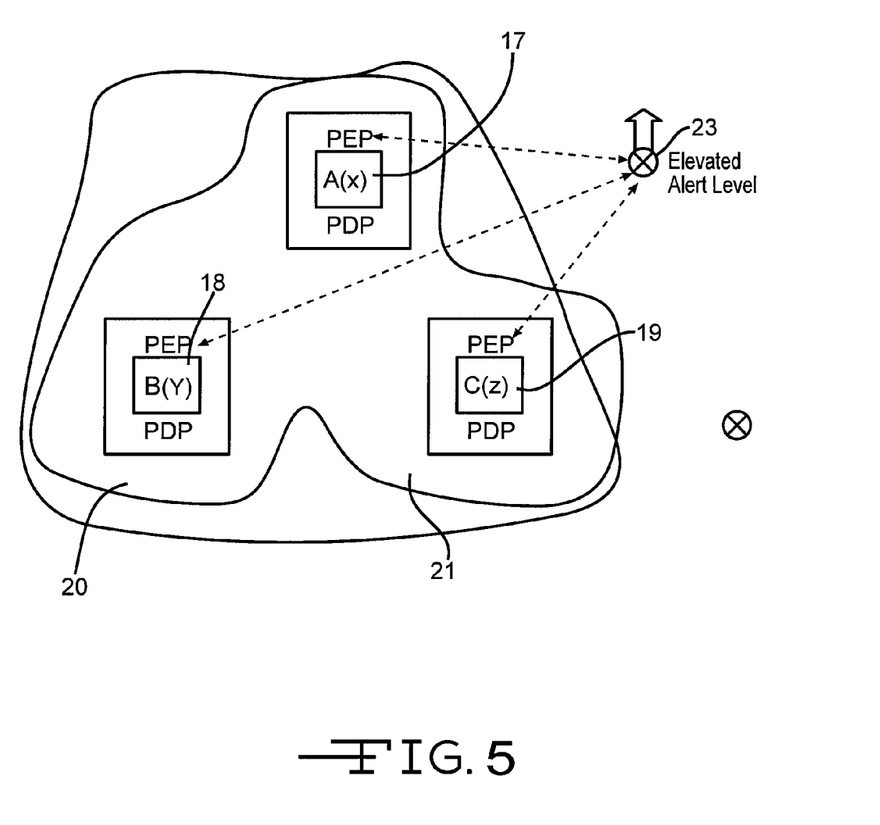
FIG. 5 shows a COI reconfiguration of FIG. 4 when alert levels may be elevated and information sharing level may be increased in response to the alert elevation situation.

FIG. 5 shows a COI reconfiguration when alert levels 23 may be elevated and information sharing level may be increased in response to the alert elevation situation. Assuming that the policies may further dictate roles, a Role-Y (EMT) of client B 18 may be entitled to COI 20 when the alert 23 is low and may also be entitled to COI 21 when the alert 23 is elevated. A Role-Z (Police) of client C 19 may be entitled to COI 21 when the alert 23 is low, and may also be entitled to COI 20 when the alert 23 is elevated. A Role-X (FBI) of client A 17 may be entitled to both COI 20 and COI 21 no matter whether the alert 23 is low or elevated. Thus, when alert level 23 is elevated, a COI configuration may be significantly augmented. Here, due to the elevated alert 23, both the EMT (Role-Y) and the FBI (Role-Z) may be sharing both COI 20 and COI 21, just like the police (Role-X). This scenario may illustrate how, in this new paradigm, when the distributed policies are evaluated in real time by PDP 9 (of FIG. 3) embedded with mobile clients 10 (of FIG. 3), contextual status may be taken into consideration and the information sharing structure via constructs such as COI may be dynamically adjusted to satisfy the need of environmental changes (e.g. elevated alert) based on the policy definition. This may represent significant progress in secure mobile ad-hoc communication environments for information sharing and overall distributed system configuration management.

To be effective as an information assurance (IA) solution, one embodiment of the disclosure may be OSI as a complimentary functional add-on to the larger policy-based IA framework. The embodiment may take the policy/role enforcement orientation further down the OSI stack to layer 3.5. This combination may present a revolutionary and innovative solution to next generation infrastructure and mobile computing. Under these policies, layer 7 applications and system may be protected from traditional software oriented attacks.

Figure 6:
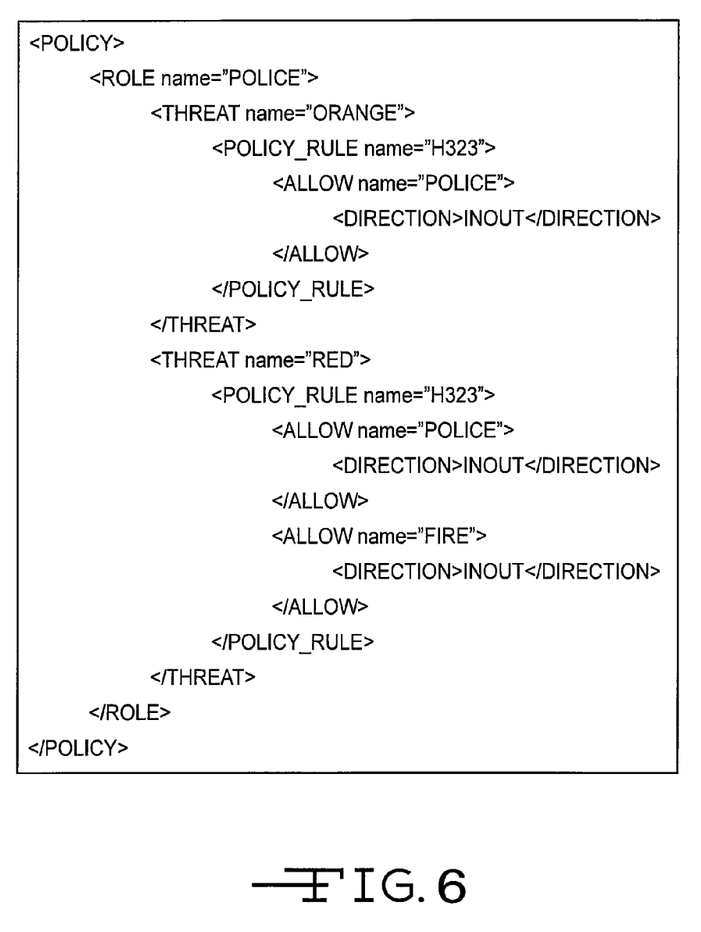
FIG. 6 shows illustrative policy specification language under one embodiment of the disclosure.

FIG. 6 shows illustrative policy specification language under one embodiment of the disclosure. The term 'policy' here simply references a service, such as H.323 VOIP (Voice Over IP) as shown in the figure. Such VOIP layer-5 policy specifications may be automatically extrapolated into layer-3.5 execution. Since a service may use multiple layer 3.5 sessions, layer 3.5 based policy management may require multiple handshakes to enforce the policy. H.323 may comprise a perfect example of a transaction based policy since only one handshake may take place for 2 transmission control protocol (TCP) sessions and 1 user datagram protocol (UDP) flow.

Figure 7:
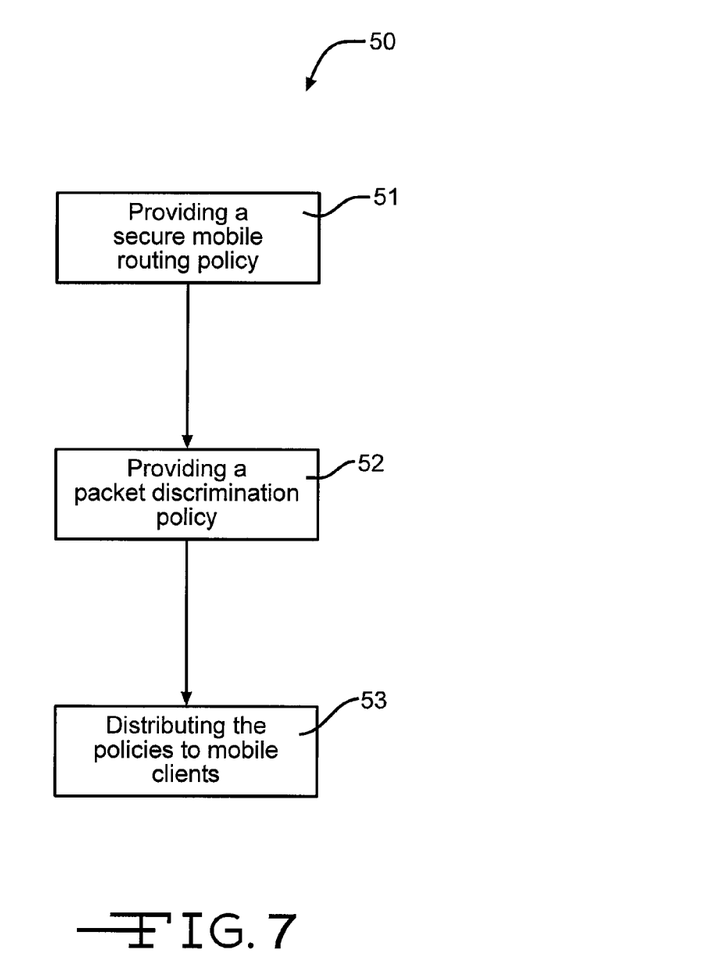
FIG. 7 is a flowchart showing one embodiment of a method of implementing policies to mobile clients.

FIG. 7 is a flowchart showing one embodiment of a method 50 of implementing policies to mobile clients. In one step 51, a secure mobile routing policy may be provided. In another step 52, a packet discrimination policy may be provided. In still another step 53, the secure mobile routing policy and the packet discrimination policy may be distributed to the mobile clients.

Figure 8:
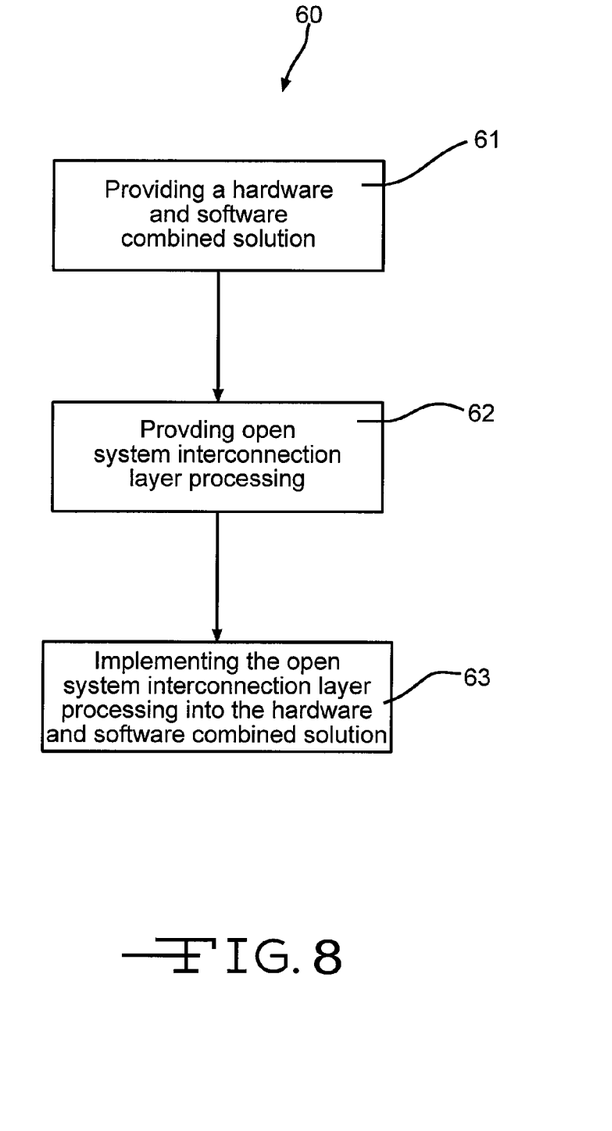
FIG. 8 is a flowchart showing another embodiment of a method for creating a hardware and software combined solution.

FIG. 8 is a flowchart showing another embodiment of a method 60 for creating a hardware and software combined solution. In one step 61, a hardware and software combined solution may be provided. In another step 62, open system interconnection layer processing may be provided. In still another step 63, the open system interconnection layer processing may be implemented into the hardware and software combined solution.

Figure 9:
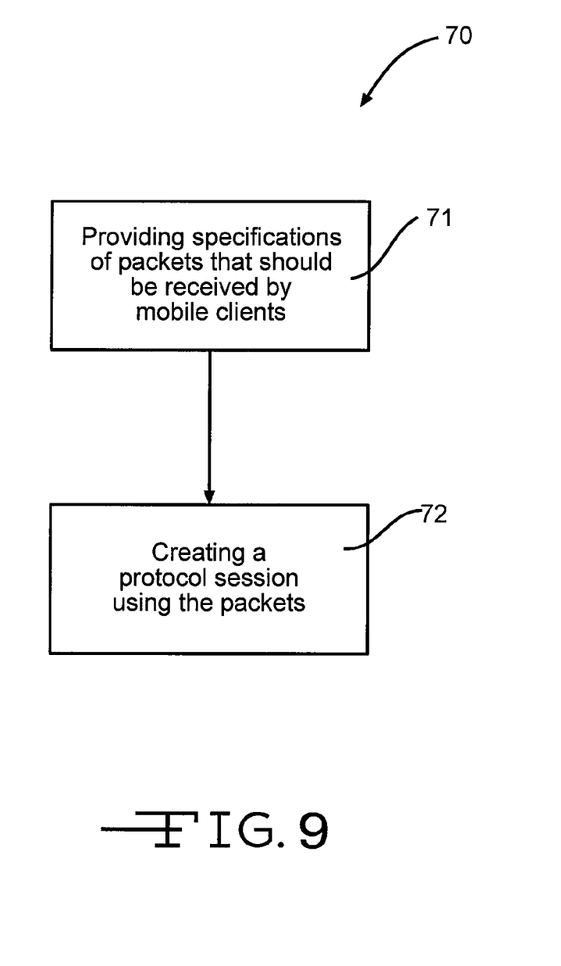
FIG. 9 is a flowchart showing still another embodiment of a method defining a packet discrimination policy.

FIG. 9 is a flowchart showing still another embodiment of a method 70 defining a packet discrimination policy. In one step 71, specifications of packets received by mobile clients may be provided. In another step 72, the packets received by the mobile clients may be used to create a protocol session at least one of at and above an open system interconnection layer 4.

Other aspects and features of the present disclosure may be obtained from a study of the drawings, the disclosure, and the appended claims. It should be understood, of course, that the foregoing relates to exemplary embodiments of the disclosure and that modifications may be made without departing from the spirit and scope of the disclosure as set forth in the following claims.

The invention claimed is:

1. A distributed security architecture implemented in a distributed computing network comprising mobile devices, the architecture comprising:
   assets protected by entitlement-specifying policies;
   a mobile anti-tamper hardware policy enforcement point that is configured to control communication behaviors of a mobile client by enforcing communication policies within a policy decision point;
   a mobile anti-tamper hardware policy decision point that is encapsulated within the mobile anti-tamper hardware policy enforcement point;
   a policy exchange channel for policy distribution nodes which is to at least one of distribute, update communication,or route security policies to the mobile client using a policy exchange protocol (PXP);
   a contextual manager handling system-wide status change update signaling;
   a mobility authentication manager providing mobile clients with registration and credential/role assignments based on mobile access policies;
   open system interconnection layers 2, 3, 3.5, 4, 5, 6, and 7 in the distributed computing network;
   wherein the open system interconnection layer 3.5 is above the open system interconnection layer 3 and provides distributed security policy enforcement and policy-based secure routing, and distributes and enforces the open system interconnection layer 3.5 security policy to mobile clients forming a policy-managed community of interest to at least two of the mobile clients and providing comprehensive information assurance in all of the open system interconnection layers; and
   the open system interconnection layer 2 provides policy-based mandatory access control address filtering to provide a secured protocol session and computing at the open system interconnection layers 4, 5, 6, and 7.

2. The distributed security architecture of claim 1 wherein the policy exchange protocol is configured to control policy distribution and updates between a policy decision point and policy distribution nodes.

3. The distributed security architecture of claim 1 further comprising policy decision point hardware implementations in the distributed computing network which are read-proof to prevent authorization logic disclosure.

4. The distributed security architecture of claim 1 wherein the mobile clients are configured to update contextual flags in the distributed computing network to create changes in a policy decision point when permission is granted by a mobile client policy decision point policy.

5. The distributed security architecture of claim 1 wherein the policy distribution nodes are configured to distribute and update communication and routing security policies to the mobile clients via the policy exchange protocol.

6. The distributed security architecture of claim 1 wherein the policy exchange protocol is configured to allow distribution of security policies from the policy distribution nodes to a policy decision point.

7. The distributed security architecture of claim 1 further comprising a contextual manager in the distributed computing network configured to update contextual flags based on notices received from policy distribution nodes which are monitored by the mobile clients.

8. The distributed security architecture of claim 1 further comprising a mobility authentication manager in the distributed computing network configured to provide identity and role information of the mobile clients to policy distribution nodes for policy distribution, updates, and alerts of a contextual manager.

9. The distributed security architecture of claim 1 further comprising a contextual manager in the distributed computing network configured to handle system-wide status change update signaling.

10. The distributed security architecture of claim 9 wherein the system-wide status change update signaling comprises at least one of an alert level update, a policy update, or a client revocation.

11. A method for a distributed security architecture implemented in a distributed computing network comprising mobile devices, the method comprising:
protecting assets by entitlement-specifying policies;
encapsulating a mobile anti-tamper hardware policy decision point within the mobile anti-tamper hardware policy enforcement point;
distributing, by a policy exchange channel for policy distribution nodes, security policies to the mobile client using a policy exchange protocol (PXP);
handling, by a contextual manager, system-wide status change update signaling;
providing, by a mobility authentication manager, mobile clients with registration and credential/role assignments based on mobile access policies;
providing open system interconnection layers 2, 3, 3.5, 4, 5, 6, and 7 in the distributed computing network, the open system interconnection layer 3.5 is above the open system interconnection layer 3;
distributing security policy enforcement and policy-based secure routing;
distributing and enforcing the open system interconnection layer 3.5 security policy to mobile clients forming a policy-managed community of interest to at least two of the mobile clients and providing comprehensive information assurance in all of the open system interconnection layers; and
providing, by the open system interconnection layer 2, policy-based mandatory access control address filtering and providing a secured protocol session and computing at the open system interconnection layers 4, 5, 6, and 7.

* * * * *